United States Patent [19]
Zhao

[11] Patent Number: 5,838,123
[45] Date of Patent: Nov. 17, 1998

[54] AUTOMATIC PHASE ADJUSTER FOR A BRUSHLESS MOTOR DRIVING SIGNAL

[75] Inventor: Chi-Mou Zhao, Taipei Hsien, Taiwan

[73] Assignee: Industrial Technology Research Institute, Taiwan

[21] Appl. No.: 802,564

[22] Filed: Feb. 19, 1997

[30]  Foreign Application Priority Data

Nov. 22, 1996 [TW]  Taiwan ................................ 85114436

[51] Int. Cl.[6] ...................................................... H02P 6/00
[52] U.S. Cl. ........................... 318/254; 318/621; 318/721
[58] Field of Search .................... 318/138, 254, 318/439, 618, 621, 700, 701, 720, 721

[56]   References Cited

U.S. PATENT DOCUMENTS

| | | | |
|---|---|---|---|
| 3,916,272 | 10/1975 | Grunleitner et al. .................... | 318/138 |
| 3,999,108 | 12/1976 | Tanikoshi ................................. | 318/138 |
| 4,008,425 | 2/1977 | Dickey ................................. | 318/254 X |
| 4,651,068 | 3/1987 | Meshkat-Razavi .................. | 318/254 X |
| 5,223,772 | 6/1993 | Carobolante ............................ | 318/254 |
| 5,367,237 | 11/1994 | Ring et al. ................................ | 318/616 |

OTHER PUBLICATIONS

Krause et al., Electromechanical Motion Devices, Section 7.6 Analysis of Steady–State Operation, pp. 283–297, McGraw–Hill, Inc. (1989).

*Primary Examiner*—Bentsu Ro
*Attorney, Agent, or Firm*—Finnegan, Henderson, Farabow, Garrett & Dunner, L.L.P.

[57]    ABSTRACT

An automatic phase adjuster for the driver of a brushless motor is provided. This automatic phase adjuster can output a driving signal adaptively with a suitable phase-lead or phase-lag angle so as to allow the motor to be operated with the optimal output characteristics, including optimal output torque, optimal output efficiency, and optimal output power at all speeds. The automatic phase adjuster is configured variously in accordance with the particular type of the motor on which the automatic phase adjuster is used. For single-direction motors operated at a fixed speed, the automatic phase adjuster includes a phase-lead filter coupled to a Hall sensor which detects the motor speed. For single-direction motors operated at various speeds, the automatic phase adjuster includes a phase-lead filter, a phase-lag filter, a multiplexer, and a Hall sensor. The multiplexer selects either the phase-lead filter or the phase-lag filter to process the motor speed signal. For dual-direction motors operated at various speeds, the automatic phase adjuster includes a phase-lead filter, a phase-lag filter, a multiplexer, and a Hall sensor. The multiplexer selects either the phase-lead filter or the phase-lag filter depending on the direction and acceleration/deceleration condition of the motor. This allows the motor to be always driven with optimal performance.

18 Claims, 11 Drawing Sheets

AUTOMATIC PHASE ADJUSTER FOR A BRUSHLESS MOTOR DRIVING SIGNAL

BACKGROUND OF THE INVENTION

1. Field of the Invention

This invention relates to motor drivers, and more particularly, to an automatic phase adjuster for the driver of a brushless motor which can automatically adjust the phase of the driving signal used to drive the motor so as to allow the motor to be operated with optimal output characteristics.

2. Description of Related Art

It is a well-known principle in electrical motor designs that the torque-versus-speed characteristic (the T-N curve) of a brushless motor changes as the phase of the driving signal used to drive the motor is varied. For details on this principle, readers can refer to Section 7.6 of the textbook "Electrical Motion Devices" authored by Paul C. Krause.

Figure 1:
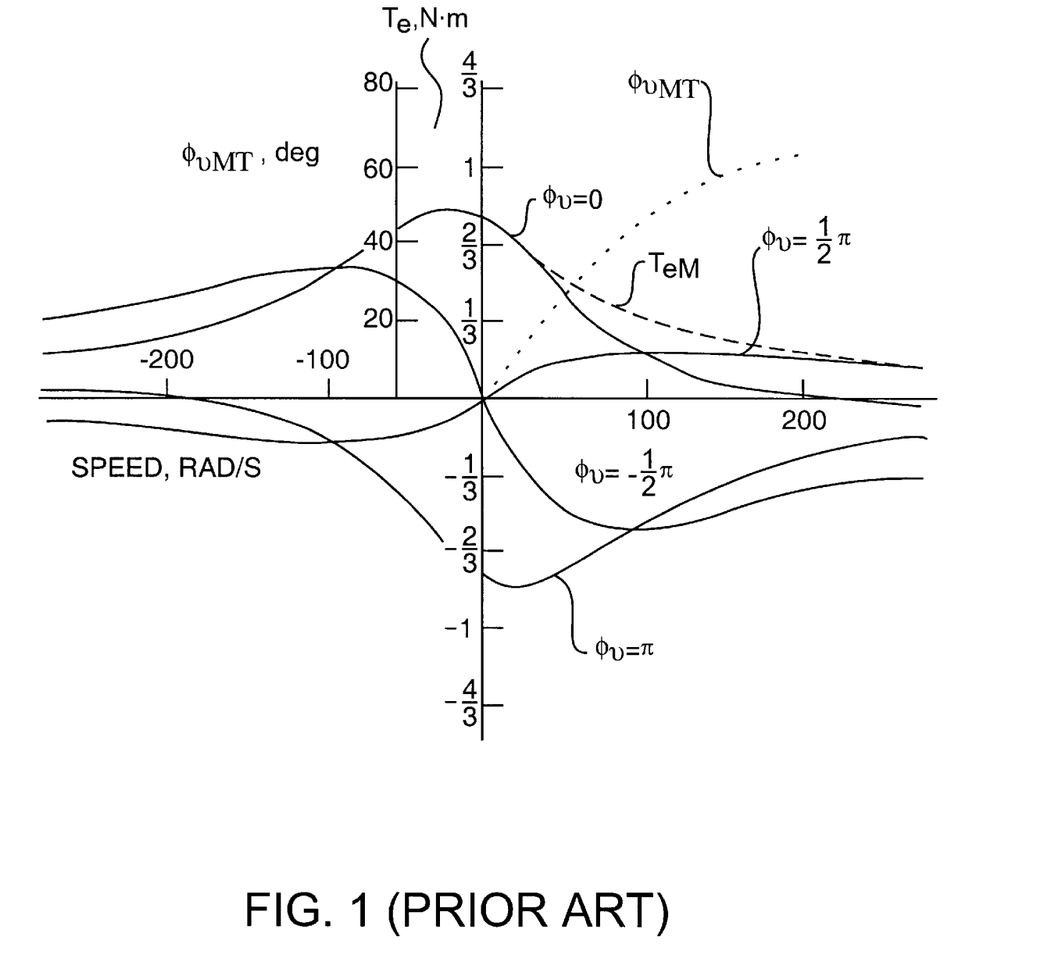
FIG. 1 is a graph showing the torque-versus-speed characteristic plot of a conventional brushless motor.

FIG. 1 shows, for example, a graph of the torque-versus-speed characteristic of a conventional brushless motor, in which the horizontal axis represents the speed of the motor and the vertical axis represents the output torque of the same. This graph shows that the starting torque in the first quadrant decreases as the phase-lead angle, represented by $\Phi_v$, is increased from 0° to 90°. In the high-speed region, the torque increases as $\Phi_v$ is increased. The $T_{eM}$ curve in FIG. 1 represents an envelope curve of the T-N curve obtained from variation of $\Phi_v$; and the $\Phi_{vMT}$ curve represents the phase-lead angle corresponding to the T-N curve. Similarly, from the efficiency-versus-speed characteristic (E-N curve) of the motor, an envelope curve $E_M$ of the E-N curve and the corresponding phase-lead angle $\Phi_{vME}$ can be obtained; and from the power-versus-speed characteristic (P-N curve), an envelope curve $P_M$ of the P-N curve and the corresponding phase-lead angle $\Phi_{vMP}$ can be obtained.

The ideal phase-lead angles are those following the $\Phi_{vMT}$, $\Phi_{vME}$, and $\Phi_{vMP}$ curves. If the motor driver can adjust the phase-lead angle of the driving signal used to drive the motor in accordance with these $\Phi_{vMT}$, $\Phi_{vME}$, and $\Phi_{vMP}$ curves, the motor will output the optimal torque-versus-speed, efficiency-versus-speed, and power-versus-speed characteristics. In other words, if the motor driver can generate a driving signal with the optimal phase angle at all speeds, the motor will achieve the optimal output characteristics at all speeds.

In typical single-phase brushless motors, such as fan motors or pump motors, the optimal phase-lead angle is within the range from 15° to 40° which allows the motor to be operated with the optimal output characteristics. This scheme, however, has several drawbacks. First, the starting torque of the motor will be low. Second, due to the low starting torque, the starting voltage required to start the motor will be high. Third, when the cogging torque and frictional torque of the motor are high, dead points easily occur in the motor.

SUMMARY OF THE INVENTION

It is therefore a primary objective of the present invention to provide an automatic phase adjuster for the driver of a brushless motor which is capable of adjusting the phase-lead angle of the driving signal in response to the motor speed so as to allow the motor to be operated with the optimal output characteristics, including output torque, output efficiency, and output power.

In accordance with the foregoing and other objectives of the present invention, a new automatic phase adjuster for the driver of a brushless motor is provided. This automatic phase adjuster allows the driver to output a driving signal with a small phase-lead angle when the motor speed is low, and with a large phase-lead angle when the motor speed is high, so as to allow the motor to produce the optimal output characteristics in torque, efficiency, and power at all speeds.

The automatic phase adjuster of the invention are configured in various embodiments in accordance with the particular type of motor on which the automatic phase adjuster is to be used. Three embodiments are disclosed, respectively for a first type of motors which are operated only in one direction at a fixed speed, a second type of motors which are operated only in one direction and can be operated at various speeds, and a third type of motors which can be operated in both directions and at various speeds.

For motors which are operated only in one direction at a fixed speed, such as fan motors or pump motors, the automatic phase adjuster includes a phase-lead filter coupled to a Hall sensor which detects the motor speed. The output of the phase-lead filter is a driving signal with a phase-lead angle that allows the motor to be operated at the maximum speed.

For motors which are operated only in one direction and can be operated at various speeds, such as hard disk driving motors, the automatic phase adjuster includes a phase-lead filter, a phase-lag filter, a multiplexer, and a Hall sensor. The multiplexer operates in such a manner that when the motor is under acceleration, the output of the phase-lead filter is selected as the output of the multiplexer; and when the motor is under deceleration, the output of the phase-lag filter is selected as the output of the same. This allows the optimal driving signal to be output to the motor regardless of whether the motor is under acceleration or under deceleration.

Further, for motors which can be operated in both directions and at various speeds, such as servo-type brushless motors, the automatic phase adjuster includes a phase-lead filter, a phase-lag filter, a multiplexer, and a Hall sensor. The multiplexer is used to select either the output of the phase-lead filter or the output of the phase-lag filter as its output. In the case of the motor running in the clockwise direction and being under acceleration, the phase-lead filter is selected; and in the case of the motor running in the clockwise direction and being under deceleration, the phase-lag filter is selected. Further, in the case of the motor running in the counterclockwise direction and being under deceleration, the phase-lag filter is selected; and in the case of the motor running in the counterclockwise direction and being under acceleration, the phase-lead filter is selected. This allows the motor to be always running with optimal performance.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENT

The automatic phase adjuster of the invention was designed by first using a simulation program to simulate the output characteristics of a brushless motor in response to the phase-lead angle $\phi_v$ of the driving signal which is varied from −30° to 60°. Specifically, the output characteristics corresponding to the phase-lead angles −30°, −15°, 0°, 15°, 30°, 45°, and 60° are simulated. Through the simulation, the simulation program generates a number of T-N curves (i.e., the torque-versus-speed characteristics at the various phase-lead angles) as illustrated in FIG. 2, a number of I-N curves (i.e., the current-versus-speed characteristic plots at the various phase-lead angles) as illustrated in FIG. 3, a number of simulated E-N curves (i.e., the efficiency-versus-speed characteristic plots at the various phase-lead angles) as illustrated in FIG. 4, and a number of P-N curves (i.e., the power-versus-speed characteristic plots at the various phase-lead angles) as illustrated in FIG. 5.

Figure 2:
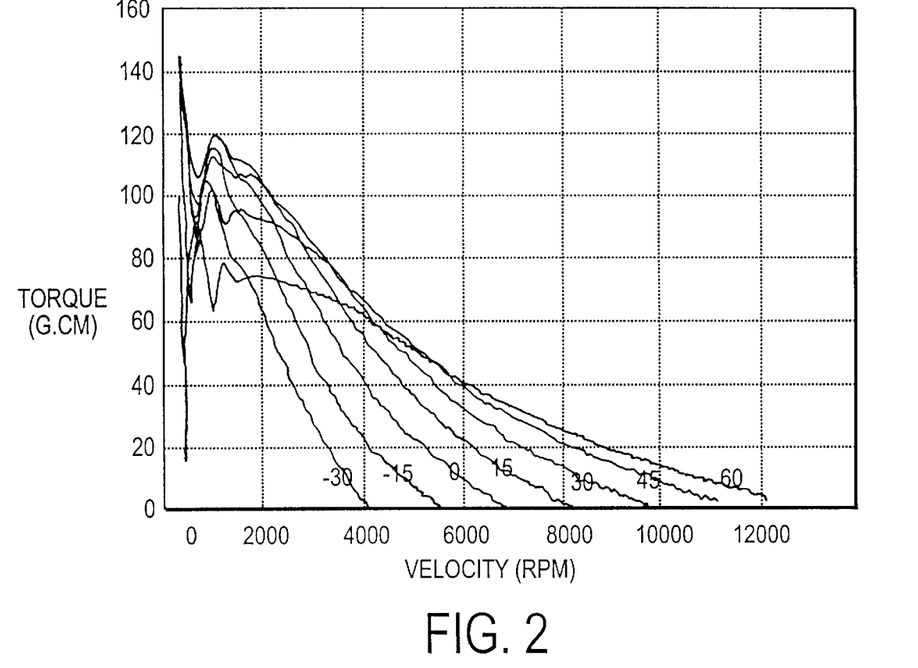
FIG. 2 is a graph showing a simulated torque-versus-speed characteristic plot (T-N curve) of a brushless motor by using a simulation software program.
Figure 6:
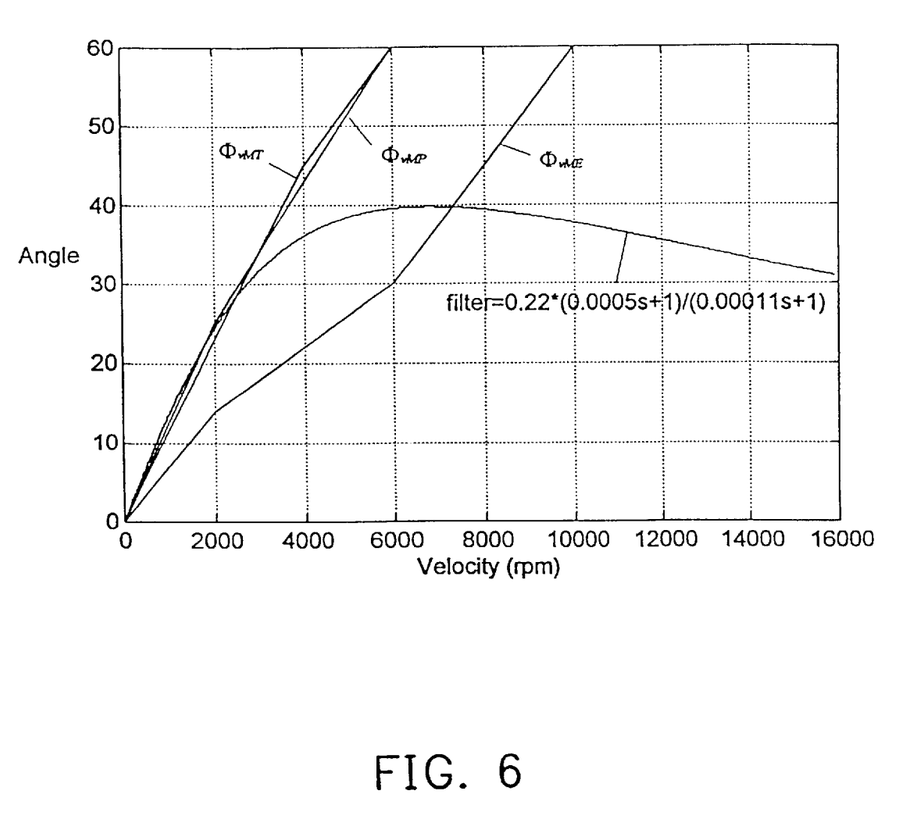
FIG. 6 is a graph showing the phase-lead angle versus speed curves for $\Phi_{vMT}$, $\Phi_{vME}$, $\phi_{vMP}$ corresponding to the envelope curves of the plots of FIG. 2, FIG. 4, FIG. 5.

To allow the motor to produce the optimal output torque, the envelope curve $T_{eM}$ (not shown) for the T-N curves of FIG. 2 is obtained to determine the corresponding angle-versus-speed curve $\Phi_{vMT}$, as illustrated in FIG. 6, that will allow for the optimal output torque from the motor.

Figure 3:
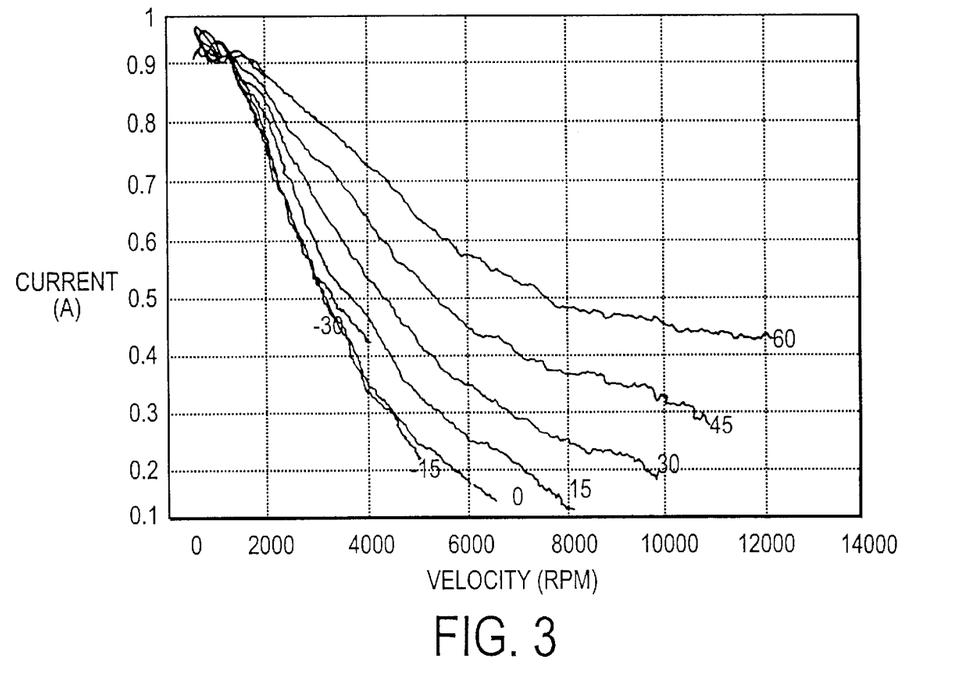
FIG. 3 is a graph showing a simulated current-versus-speed characteristic plot (I-N curve)
Figure 4:
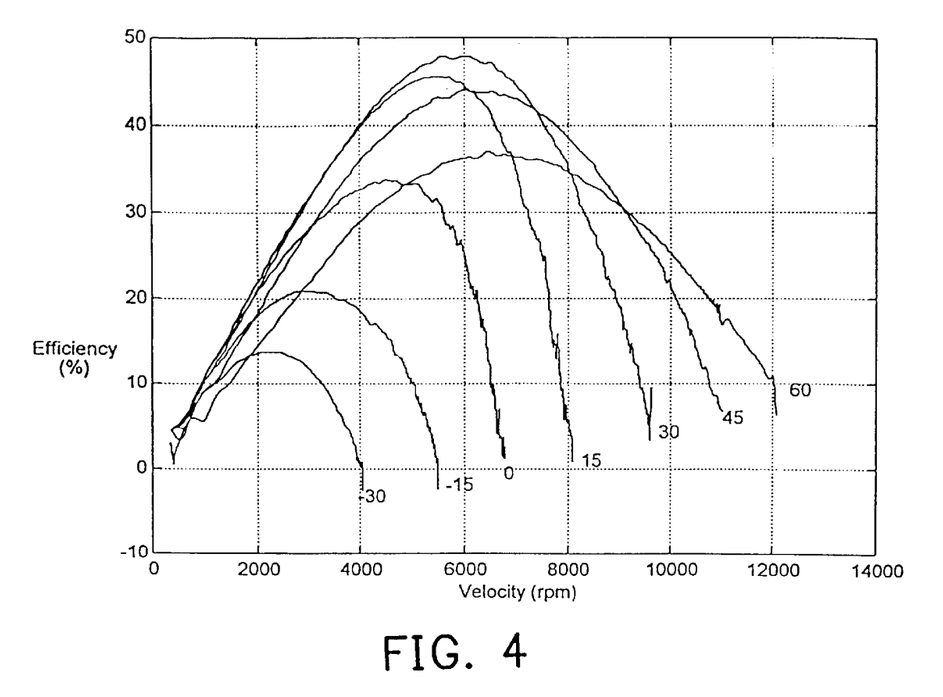
FIG. 4 is a graph showing a simulated efficiency-versus-speed characteristic plot (E-N curve)

To allow the motor to produce the optimal output efficiency, the envelope curve $E_M$ (not shown) for the E-N curves of FIG. 3 is obtained to determine the corresponding angle-versus-speed curve $\Phi_{vME}$, as illustrated in FIG. 6, that will allow for the optimal output efficiency from the motor.

Figure 5:
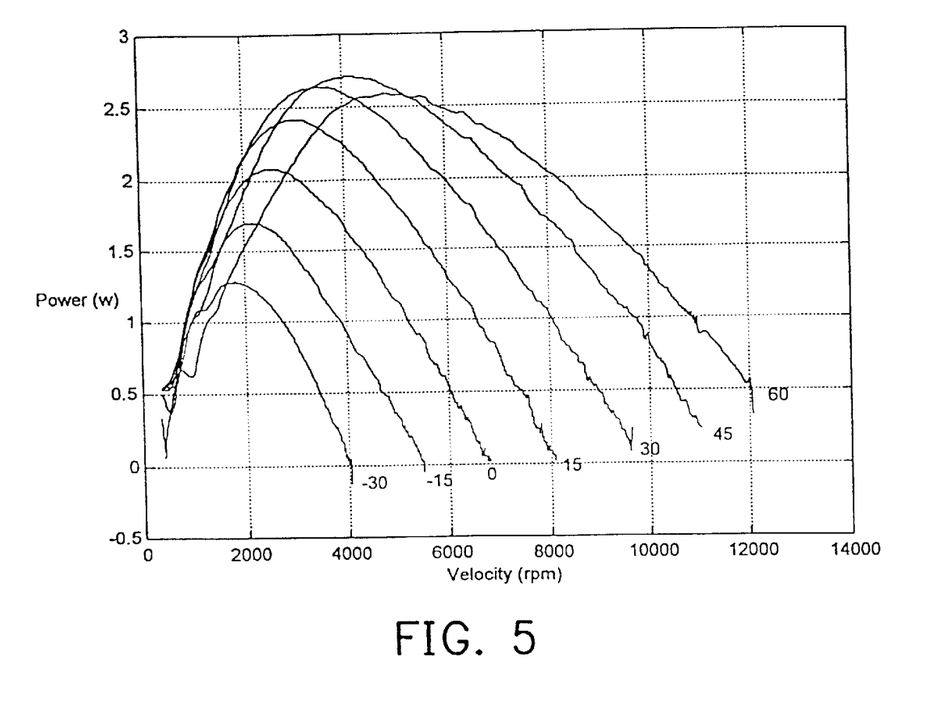
FIG. 5 is a graph showing a simulated power-versus-speed characteristic plot (P-N curve)

To allow the motor to produce the optimal output power, the envelope curve $P_M$ (not shown) for the P-N curves of FIG. 5 is obtained to determine the corresponding angle-versus-speed curve $\Phi_{vMP}$, as illustrated in FIG. 6, that will allow for the optimal output power from the motor.

Figure 7:
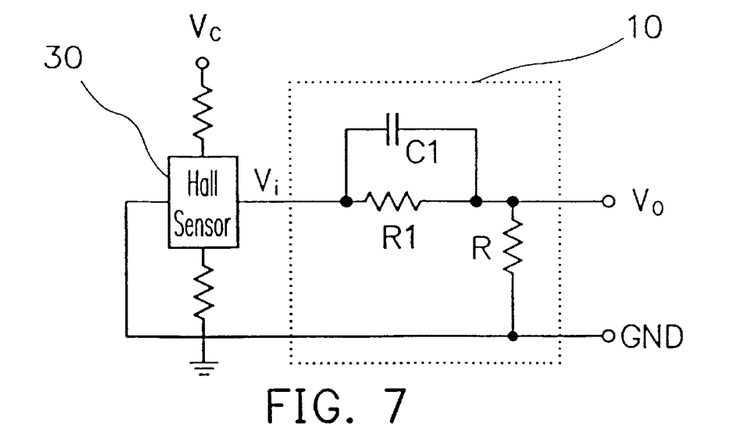
FIG. 7 is a schematic circuit diagram of a phase-lead automatic phase adjuster according to the present invention.
Figure 8:
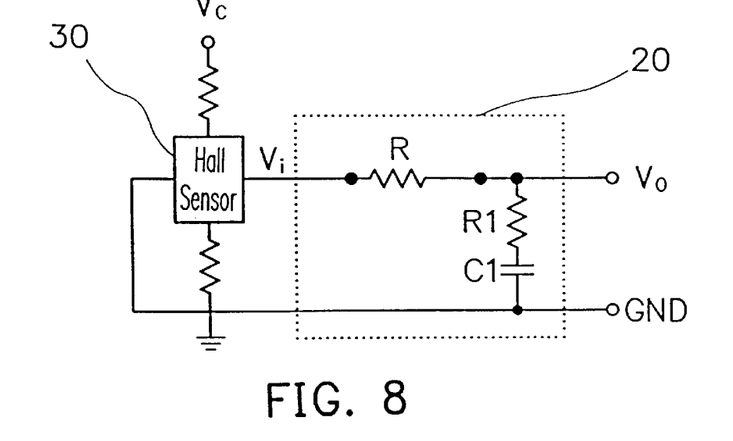
FIG. 8 is a schematic circuit diagram of a phase-lag automatic phase adjuster according to the present invention.

FIG. 7 and FIG. 8 respectively show a phase-lead automatic phase adjuster and a phase-lag automatic phase adjuster which are devised in accordance with the invention to provide a driving signal with the optimal phase-lead or phase-lag angle that allows the motor to be operated with the optimal output characteristics. As shown in FIG. 7, the phase-lead automatic phase adjuster includes a phase-lead filter 10 and a Hall sensor 30; and as shown in FIG. 8, the phase-lag automatic phase adjuster is substantially similar in circuit configuration to the phase-lead automatic phase adjuster of FIG. 7, except for the incorporation of a phase-lag filter 20 instead of the phase-lead filter 10.

In the circuit of FIG. 7, the phase-lead filter 10 is an RC circuit composed of a resistor $R_1$, a capacitor $C_1$ connected in parallel with the resistor $R_1$, and a resistor R connected to $R_1$ and $C_1$. In the circuit of FIG. 8, the phase-lag filter 20 is also an RC circuit but connected in a different manner in which the resistor $R_1$ and capacitor $C_1$ are connected in series.

The transfer function $G_{lead}(s)$ of the phase-lead filter 10 and the transfer function $G_{lag}(s)$ of the phase-lag filter 20 are respectively shown below:

$$G_{lead}(s) = \frac{v_o}{v_i} = \alpha \cdot \frac{\tau \cdot s + 1}{\alpha \cdot \tau \cdot s + 1}$$

$$G_{lag}(s) = \frac{v_o}{v_i} = \frac{\tau \cdot s + 1}{(\tau \cdot \alpha) \cdot s + 1}$$

where $\tau = R_1 \cdot C_1$, which is the time constant of the RC circuit;

$$\alpha = \frac{R_1}{R_1 + R} \;;$$

and s is the complex frequency variable.

Figure 9:
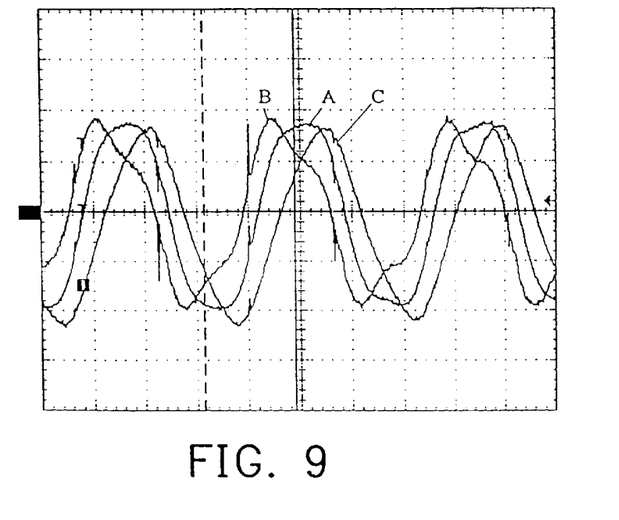
FIG. 9 is a graph showing the output characteristics of the phase-lead automatic phase adjuster shown in FIG. 7 and the phase-lag automatic phase adjuster shown in FIG. 8 in response to the motor speed signal.

FIG. 9 is a graph showing three waveform plots A, B, C. The plot A is the waveform of the output signal $V_i$ of the Hall sensor 30; the plot B is the waveform of the output signal $V_o$ of the phase-lead filter 10 of the circuit of FIG. 7; and the plot C is the waveform of the output signal $V_o$ of the phase-lag filter 20 of the circuit of FIG. 8. The output signal $V_o$ is the driving signal used to drive a brushless motor (not shown) connected to the phase-lead filter 10 or the phase-lag filter 20.

In practical applications, either one of the phase-lead filter 10 and the phase-lag filter 20, or both, are selected for use depending on the types of the motors being driven.

Figure 10:
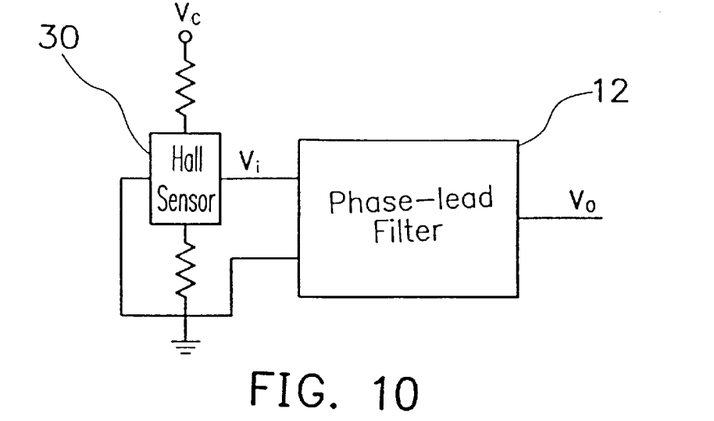
FIG. 10 is a schematic block diagram of a first preferred embodiment of the automatic phase adjuster according to the present invention.

For motors which are operated only in one direction at a fixed speed (i.e., which are driven without the need of deceleration during operation), such as fan motors or pump motors, the automatic phase adjuster of the invention is configured as shown in FIG. 10, in which only one phase-lead filter (here labeled with the reference numeral 12) is coupled to the Hall sensor 30. The output $V_o$ of the phase-lead filter 12 allows the motor (not shown) being driven thereby to be operated at maximum speed.

Figure 11:
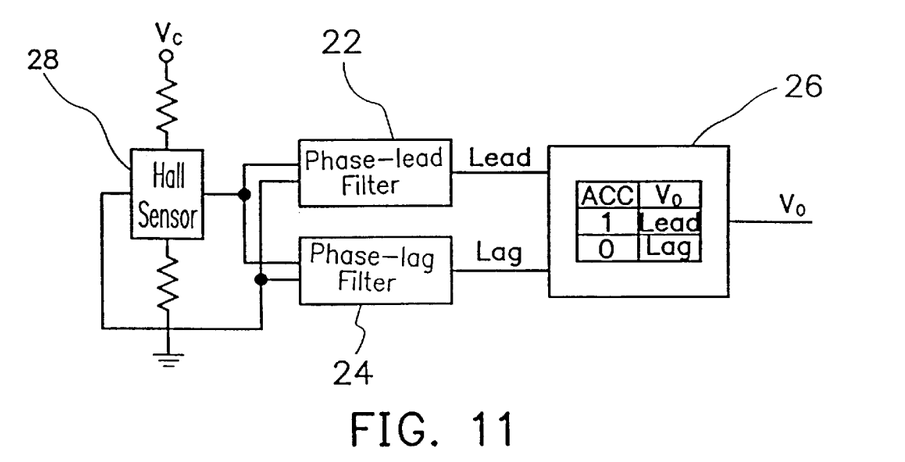
FIG. 11 is a schematic block diagram of a second preferred embodiment of the automatic phase adjuster according to the present invention.

For motors which are operated only in one direction and can be operated at various speeds, such as hard disk driving motors, the automatic phase adjuster of the invention is configured as shown in FIG. 11, which includes a phase-lead filter (here labeled with the reference numeral 22), a phase-lag filter (here labeled with the reference numeral 24), a multiplexer 26, and a Hall sensor (here labeled with the reference numeral 28). The multiplexer 26 operates in such a manner that when the motor is under acceleration, the phase-lead filter 22 is selected by the multiplexer 26; and when the motor is under deceleration, the phase-lag filter 24 is selected by the same. The selection is controlled by a binary signal ACC. When ACC=1, the phase-lead filter 22 is selected; and when ACC=0, the phase-lag filter 24 is selected. This allows the optimal driving signal $V_o$ to be output to the motor (not shown) regardless of whether the motor is under acceleration or under deceleration.

Figure 12:
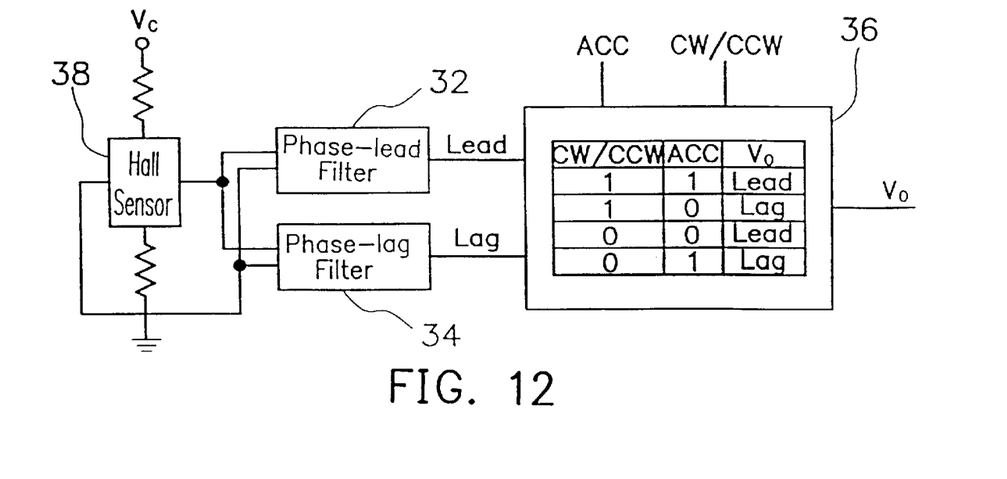
FIG. 12 is a schematic block diagram of a third preferred embodiment of the automatic phase adjuster according to the present invention.

Further, for motors which can be operated in both directions and at various speeds, such as servo-type brushless motors, the automatic phase adjuster of the invention is configured as shown in FIG. 12, which includes a phase-lead filter (here labeled with the reference numeral 32), a phase-lag filter (here labeled with the reference numeral 34), a multiplexer 36, and a Hall sensor (here labeled with the reference numeral 38). The multiplexer 36 is used to select either the output lead of the phase-lead filter 32 or the output lag of the phase-lag filter 34 as its output $V_o$. The selection is determined by two binary control signals ACC and CW/CCW. When the motor is under acceleration, ACC=1; and when the motor is under deceleration, ACC=0. Further, when the motor is operated in the clockwise direction, CW/CCW=1; and when the motor is operated in the counterclockwise direction, CW/CCW=0. Whether the phase-lead filter 32 or the phase-lag filter 34 is selected by the multiplexer 36 is determined by ACC and CW/CCW in accordance with the following table:

| Condition | Selection |
|---|---|
| CW/CCW = 1, ACC = 1 | Lead |
| CW/CCW = 1, ACC = 0 | Lag |
| CW/CCW = 0, ACC = 0 | Lead |
| CW/CCW = 0, ACC = 1 | Lag |

Figure 15A:
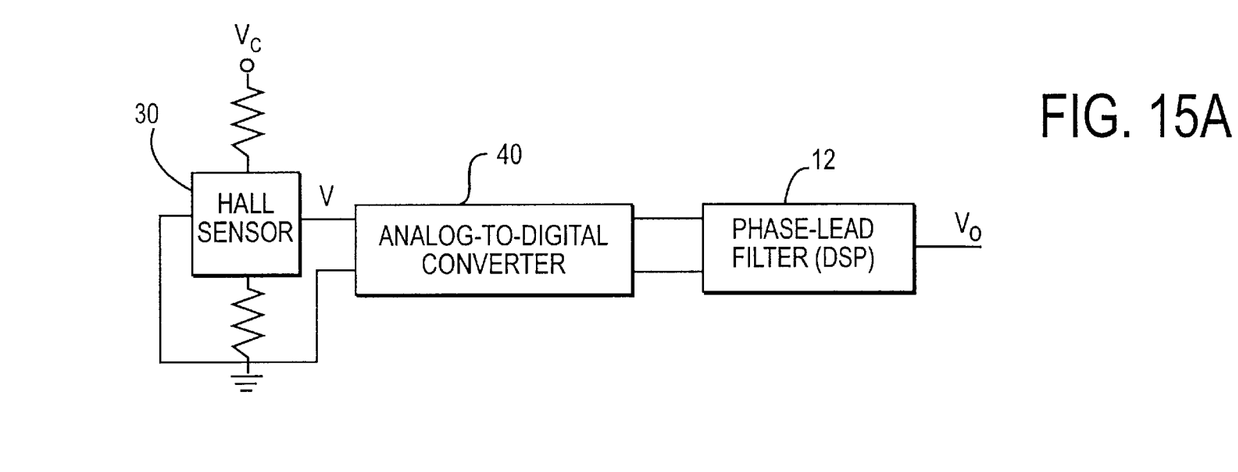
FIGS. 15a–15c are schematic block diagrams of the automatic phase adjuster of FIGS. 10–12, respectively, including an analog-to-digital converting means.
Figure 15B:
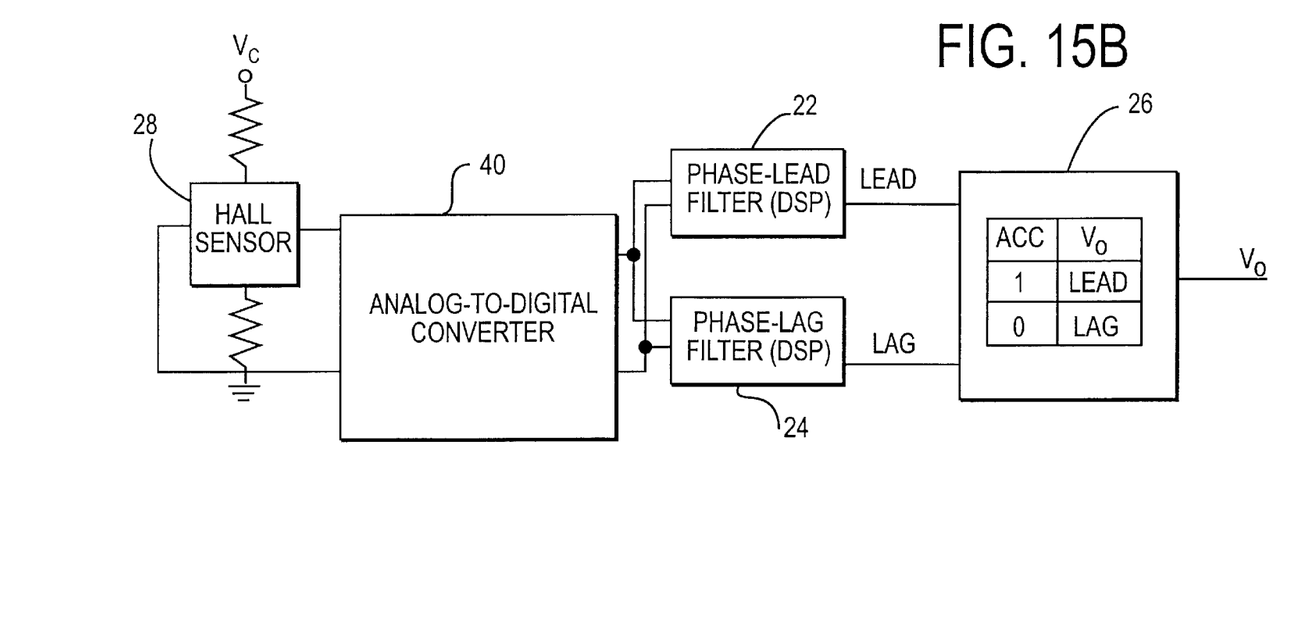
Figure 15C:
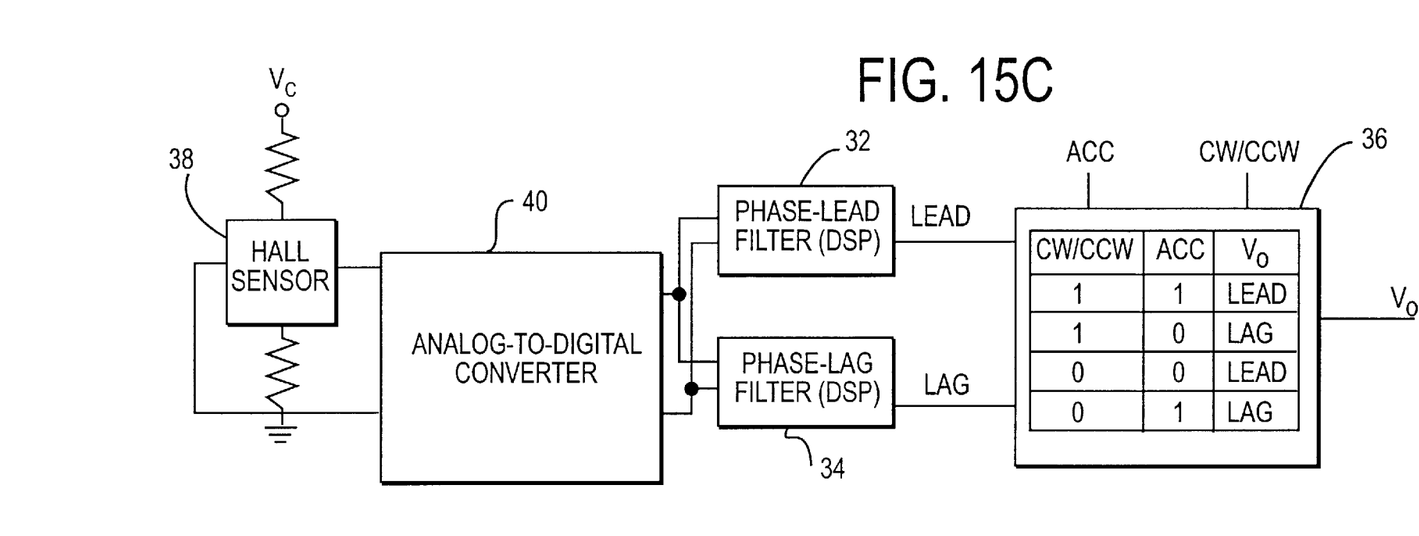
Figure 16A:
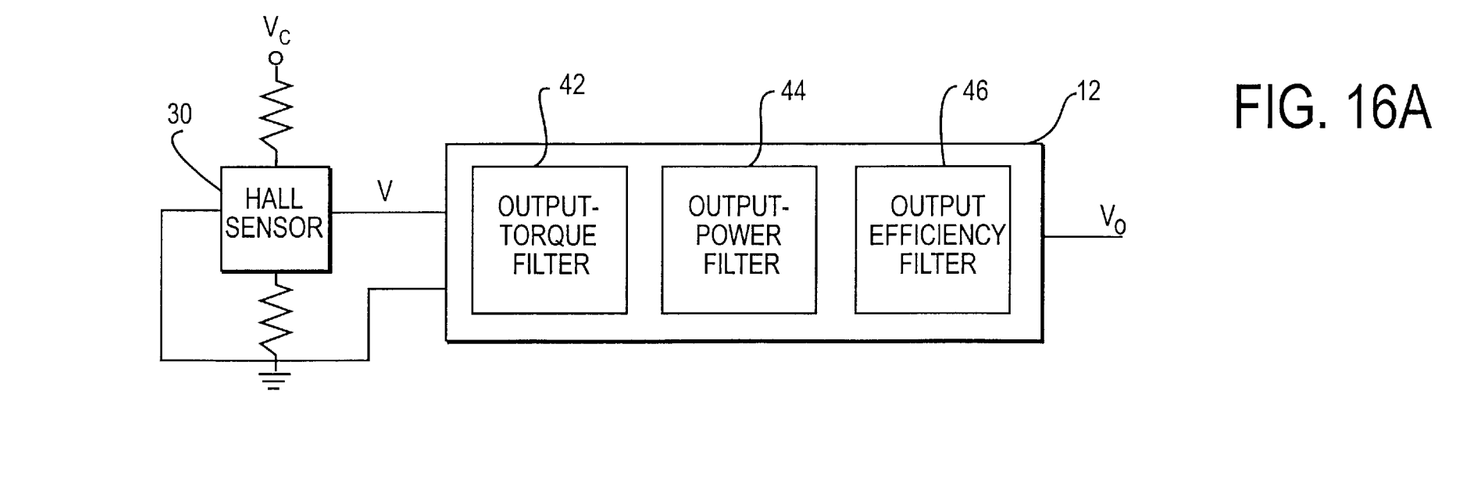
FIGS. 16a–16c are schematic block diagrams of the automatic phase adjuster of FIGS. 10–12, respectively, including a plurality of filters.
Figure 16B:
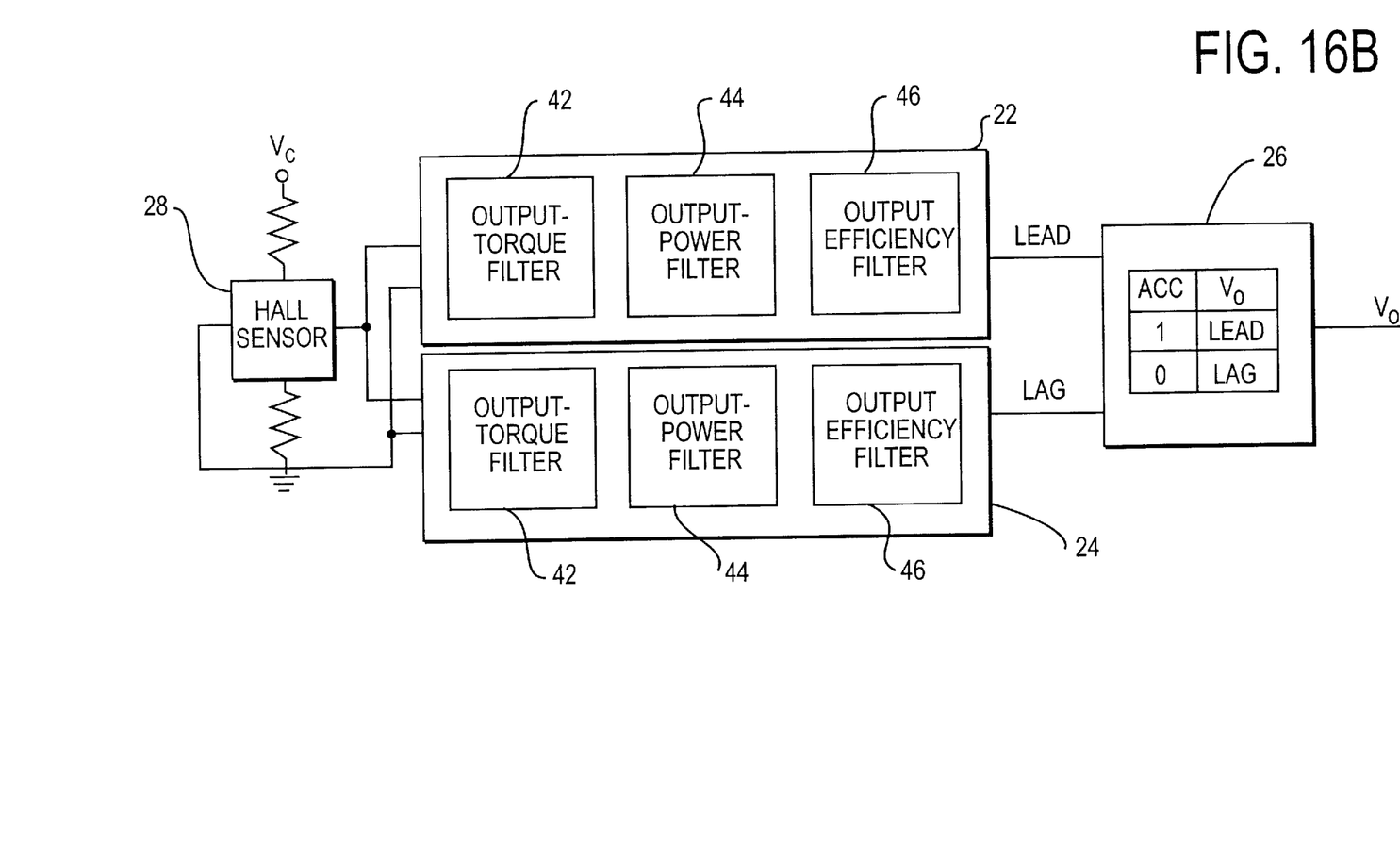
Figure 16C:
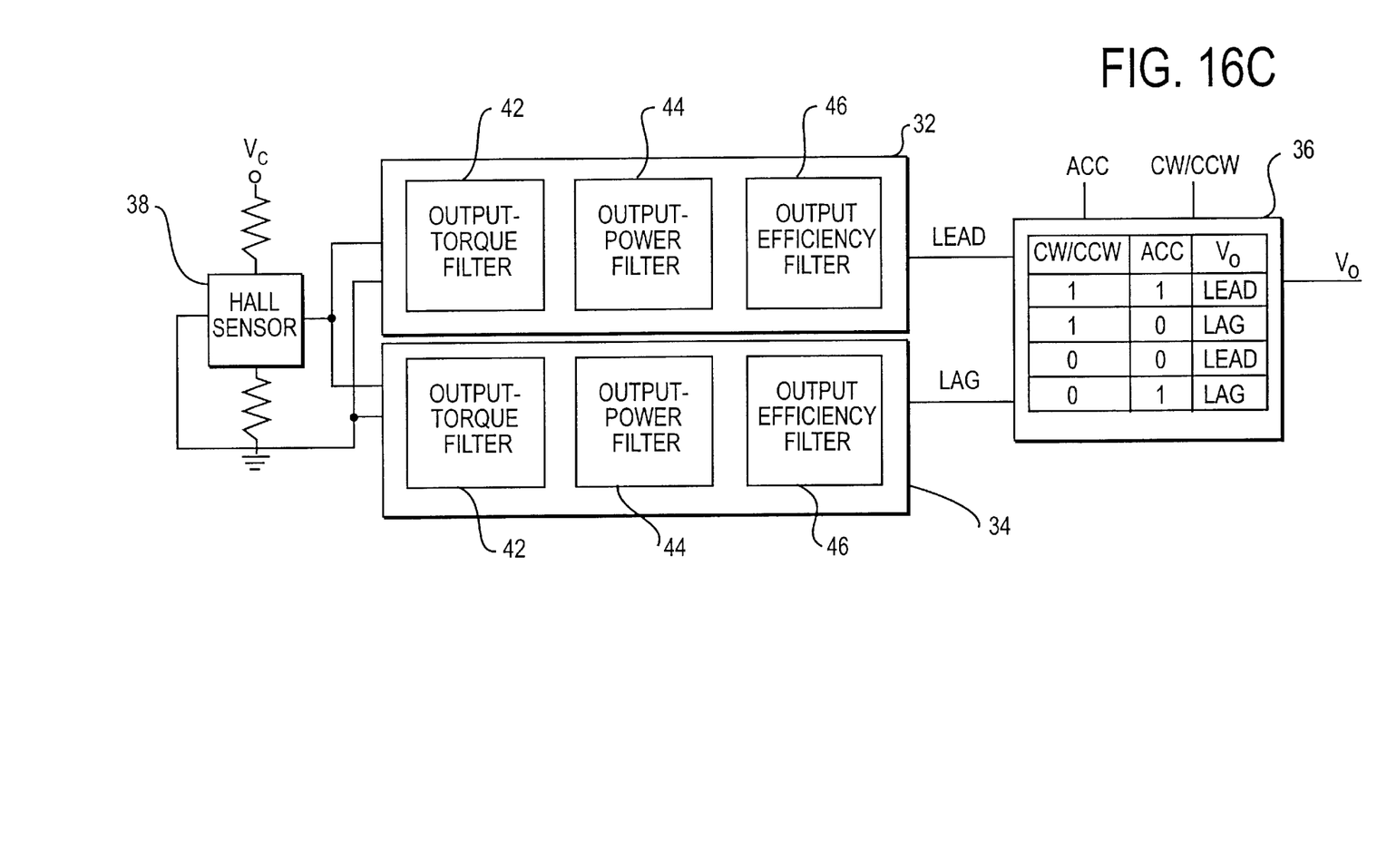

Alternatively, the circuits of FIG. 10, FIG. 11, and FIG. 12 can be implemented by software or firmware. The motor speed can be detected either by an encoder, a speed sensor, or a Hall sensor and subsequently converted to digital form by analog-to-digital converting means 40, as shown in FIGS. 15a–15c allowing the processing by the phase-lead filter and the phase-lag filter to be carried out by a digital signal processor (DSP). The multiplexer can also be implemented by software. The software implementation allows the designer to design digital filters of various purposes, as shown in FIGS. 16a–16c such as an optimal output-torque filter 42, an optimal output-power filter 44, an optimal output-efficiency filter 46, and so on, and then select a suitable one from these digital filters during operation of the motor. For instance, the optimal torque filter is selected when the motor starts, and the optimal efficiency filter is selected when the motor is running at a constant speed.

Figure 13:
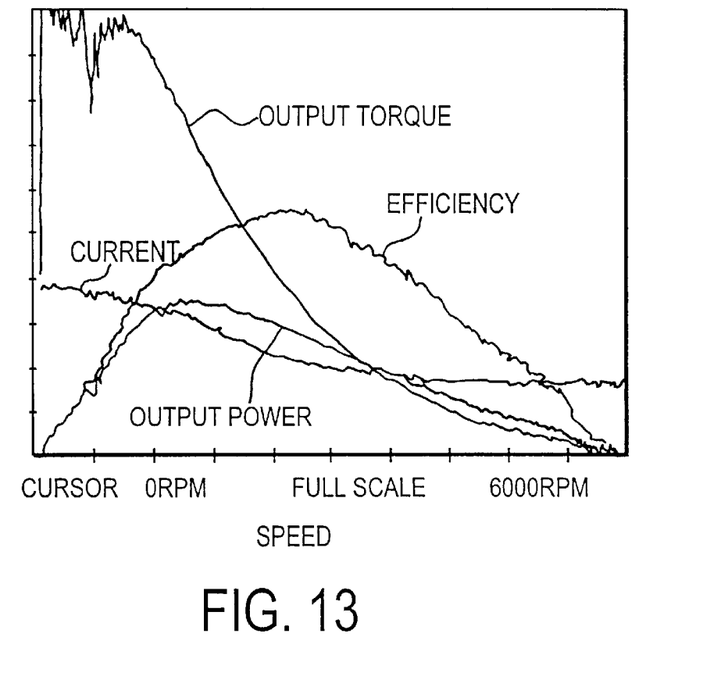
FIG. 13 is a graph showing the output characteristic of an optical disc driving motor on which the automatic phase adjuster of the invention is not provided.
Figure 14:
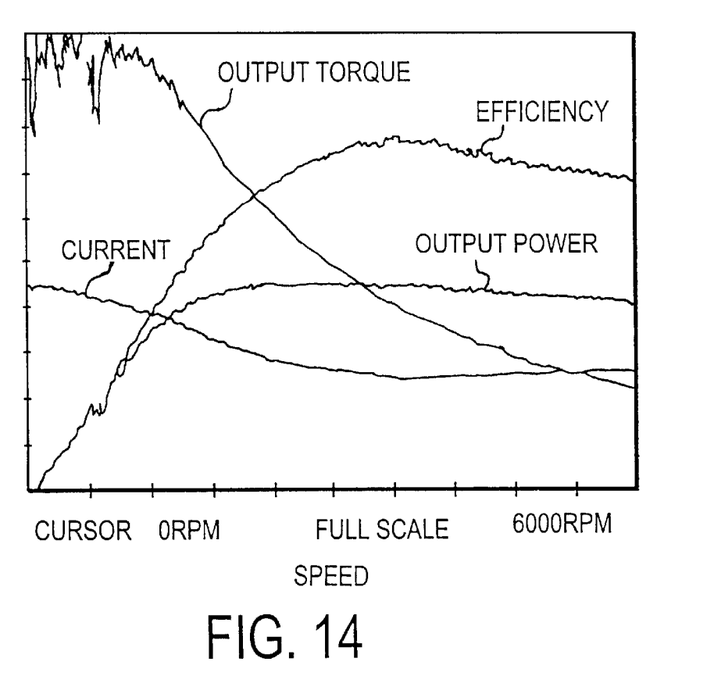
FIG. 14 is a graph showing the output characteristic of an optical disc driving motor on which the automatic phase adjuster of the invention is provided.

FIG. 13 is a graph showing the output characteristics, including the torque-versus-speed, the current-versus-speed, the efficiency-versus-speed, and the power-versus-speed characteristics, of an optical disc driving motor on which the automatic phase adjuster of the invention is not provided. For comparison, FIG. 14 is a graph showing the same of an optical disc driving motor on which the automatic phase adjuster of the invention is provided. It can be seen from FIG. 14 that the automatic phase adjuster of the invention allows the motor to be operated with about a 100% increase in maximum speed and about a 40% increase in maximum efficiency.

The invention has been described using exemplary preferred embodiments. However, it is to be understood that the scope of the invention is not limited to the disclosed embodiments. To the contrary, it is intended to cover various modifications and similar arrangements. The scope of the claims, therefore, should be accorded the broadest interpretation so as to encompass all such modifications and similar arrangements.

What is claimed is:

1. An automatic phase adjuster for a brushless motor, comprising:

means for sensing the speed of the motor;

a plurality of phase-lead filters, coupled to said motor speed sensing means, for generating a phase-lead driving signal; and multiplexer means, coupled to said phase-lead filters, for selectively connecting an output of one of said phase-lead filters as an output of said multiplexer means.

2. The automatic phase adjuster of claim 1, wherein said motor is of the type which operates in one direction and at a fixed speed.

3. The automatic phase adjuster of claim 1, further comprising:

analog-to-digital converting means for converting an output of said motor speed sensing means into digital form; and wherein said phase-lead filters are digital signal processors coupled to said analog-to-digital converting means.

4. The automatic phase adjuster of claim 1, wherein said multiplexer means is implemented as software.

5. The automatic phase adjuster of claim 1, wherein said phase-lead filters include an optimal output-torque phase-lead filter, an optimal output-power phase-lead filter, and an optimal output-efficiency phase-lead filter.

6. The automatic phase adjuster of claim 5, wherein said optimal output-torque filter outputs a driving signal with a phase-lead angle that allows the motor to produce an optimal output torque.

7. The automatic phase adjuster of claim 5, wherein said optimal output-power filter outputs a driving signal with a phase-lead angle that allows the motor to produce an optimal output power.

8. The automatic phase adjuster of claim 5, wherein said optimal output-efficiency filter outputs a driving signal with a phase-lead angle that allows the motor to produce an optimal output efficiency.

9. The automatic phase adjuster of claim 1, wherein said motor speed sensing means is a Hall sensor.

10. An automatic phase adjuster for a brushless motor, comprising:

means for sensing the speed of the motor;

at least one phase-lead filter, coupled to said motor speed sensing means, for generating a phase-lead driving signal;

at least one phase-lag filter, coupled to said motor speed sensing means, for generating a phase-lag driving signal; and multiplexer means for selectively connecting one of the phase-lead driving signal and the phase-lag driving signal as output.

11. The automatic phase adjuster of claim 10, wherein said motor is of the type which operates in one direction and at various speeds.

12. The automatic phase adjuster of claim 10, wherein said motor is of the type which operates in two directions and at various speeds.

13. The automatic phase adjuster of claim 10, further comprising:

analog-to-digital converting means for converting an output of said motor speed sensing means into digital form; and wherein said phase-lead filter and said phase-lag filter are digital signal processors coupled to said analog-to-digital converting means.

14. The automatic phase adjuster of claim 10, wherein said phase-lead filter and said phase-lag filter are each an optimal output-torque filter which outputs a driving signal with a phase angle that allows the motor to produce an optimal output torque.

15. The automatic phase adjuster of claim 10, wherein said phase-lead filter and said phase-lag filter are each an optimal output-efficiency filter which outputs a driving signal with a phase angle that allows the motor to produce an optimal output efficiency.

16. The automatic phase adjuster of claim 10, wherein said phase-lead filter and said phase-lag filter are each an optimal output-power filter which outputs a driving signal with a phase angle that allows the motor to produce an optimal output power.

17. The automatic phase adjuster of claim 10, comprising:

a plurality of phase-lead filters, including an optimal output-torque phase-lead filter, an optimal output-power phase-lead filter, and an optimal output-efficiency phase-lead filter; and a plurality of phase-lag filters, including an optimal output-torque phase-lag filter, an optimal output-power phase-lag filter, and an optimal output-efficiency phase-lag filter.

18. The automatic phase adjuster of claim 10, wherein said motor speed sensing means is a Hall sensor.

\* \* \* \* \*